United States Patent Office 3,329,454
Patented July 4, 1967

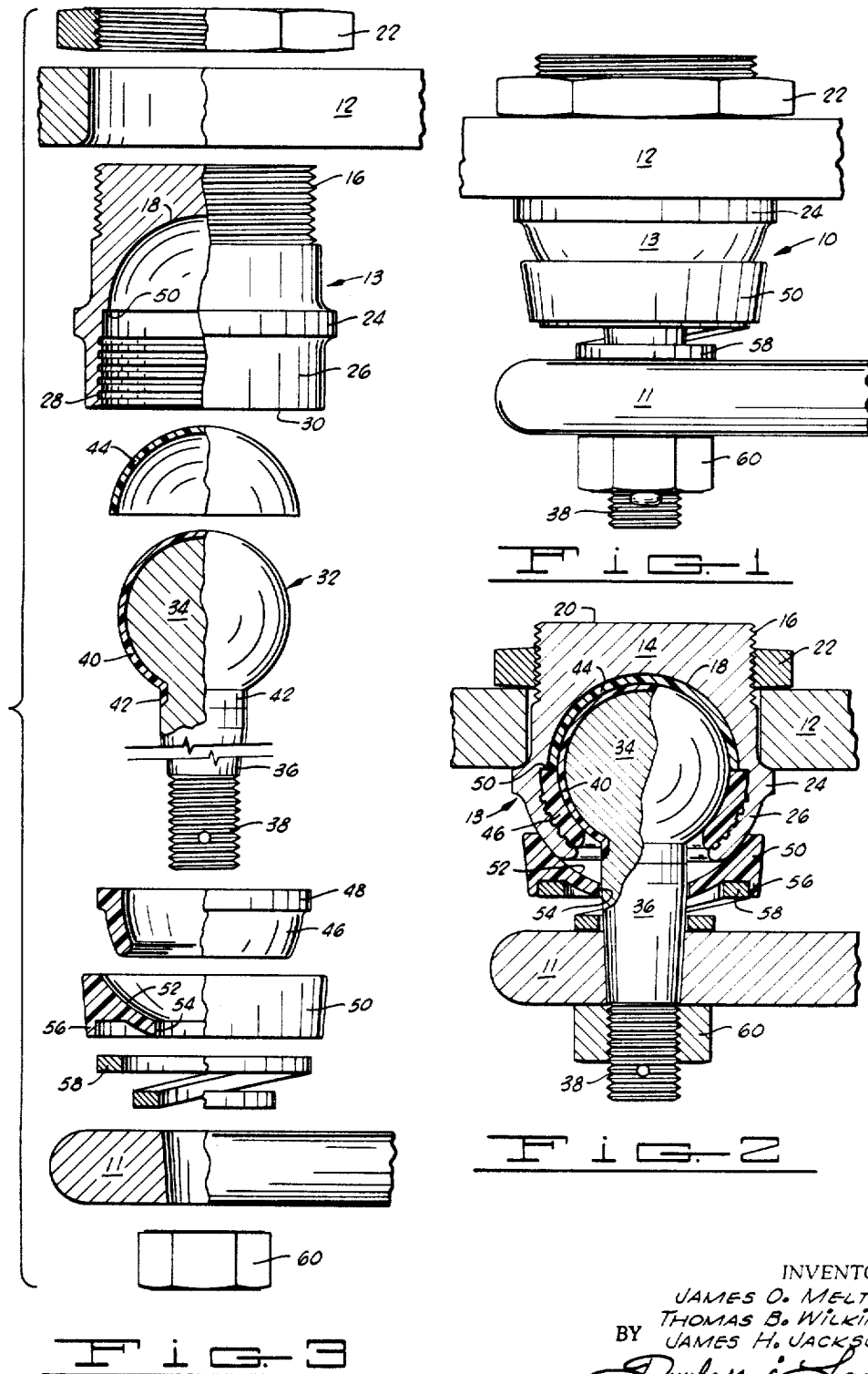

1

3,329,454
BALL AND SOCKET JOINT
James O. Melton, 1208 Cruce St., Norman, Okla. 73069;
Thomas B. Wilkinson, 5925 S. Eggleston 73109; and
James H. Jackson, 1730 N. Shawnee 73107, both of
Oklahoma City, Okla.
Filed June 15, 1964, Ser. No. 374,905
5 Claims. (Cl. 287—90)

This invention relates to a pivotal connection for interconnecting two members adapted to move relatively with respect to each other. More particularly, but not by way of limitation, the present invention relates to a ball and socket joint which is especially well-adapted for use in interconnecting two of the moving elements used in the steering mechanism of automobiles.

A great many different types of ball and socket joints have been utilized to interconnect the moving elements of the steering linkage used in the steering assembly of automobiles. Recently, the use of high density synthetic resins as materials of construction such joints has become more and more prevalent in that such materials possess high mechanical strength, are resistive to corrosion and deleterious attack by water and oil, and, in many instances, are characterized by low coefficients of friction which reduce the lubrication requirements of such joints, or, in some cases, eliminate entirely the requirement for periodic lubrication.

The present invention provides a novel ball and socket joint which is compact, mechanically sturdy in construction and characterized by a long and trouble-free operating life. The use of plastic to plastic bearing surfaces in the joint eliminates the need for periodic lubrication and the particular manner of constructing the metallic socket in which the ball portion of the joint moves reduces the cost of construction and permits the joint to be maintained in a sealed status throughout its operating life. The construction of the metallic socket further greatly facilitates the connection of the joint to the two relatively moving members which it is used to interconnect and substantially enhances the overall mechanical strength of the joint.

More specifically, the ball and socket joint of the present invention comprises a unitary metallic socket which is formed from a single metal forging of generally cylindrical configuration with said forging then being swaged or distorted through the use of a proper die to confine and permanently enclose a ball member which is positioned therein. Once the ball member and its associated bearing elements have been positioned in the metallic socket and the socket has been bent by the die into a configuration which encloses the ball member, the ball member, though being permitted to pivot freely in the socket, is prevented from moving longitudinally along its axis and is firmly retained by the socket against such longitudinal movement, as well as movement in a direction which is transverse with respect to such axis.

In the interior of the metallic socket, the ball member which is employed is preferably a metallic spherical member encased in a suitable high density synthetic resin. A two-part resin liner is placed in the socket to surround the ball member to provide plastic to plastic bearing surfaces inside the socket after the metallic socket has been closed by the action of the die as previously described. Suitable serrations or grooves are provided in the walls of the metallic socket adjacent the high density synthetic

2 resin liner and these grooves or serrations bite into the liner when the socket is forced inwardly by the die to its final position.

With the construction described, the ball joint so formed is permanently sealed over a substantial portion of the periphery of the ball member so that a minimum of accessibility of dust, water and contaminants can enter the interior of the socket. Moreover, the generally cylindrical casting used in the fabrication of the metallic socket permits machining of an external thread thereon to be more easily and inexpensively accomplished, and permits the ball and socket joint to be more easily and rapidly mounted in a steering control arm than has characterized ball and socket joints of this type as the same have been previously constructed.

From the foregoing description of the invention, it will be perceived that the present invention provides a novel ball and socket joint which can be more easily and less expensively constructed than the types of ball and socket joints previously constructed and used for the purpose of interconnecting two relatively moving members.

A further object of the present invention is to provide a more completely sealed ball and socket joint than types previously in use so that less malfunctioning is experienced over the life of the joint as a result of infiltration into the interior of the joint of dust, water, mud and other foreign materials.

An additional object of the present invention is to provide a ball and socket joint which may be used to interconnect two relatively moving members, and which may be disconnected from the members without exposing the ball member or interior of the socket to dust, grease or other deleterious foreign materials.

In addition to the foregoing described objects and advantages, other objects and advantages characteristic of the present invention will become apparent as the following detailed description thereof is read in conjunction with the accompanying drawings which illustrate the invention.

In the drawings:

FIGURE 1 is a view in elevation of the ball and socket joint of the present invention as the same appears when assembled and used to pivotally interconnect two relatively moving members.

FIGURE 2 is a partial sectional view taken along a vertical plane through the center of the assembly shown in FIGURE 1.

FIGURE 3 is an exploded view of the assembly shown in FIGURES 1 and 2 and illustrating in greater detail the specific construction of the ball and socket joint of the present invention. The socket member of the ball and socket joint has been illustrated in FIGURE 3 in the form which the socket assumes just prior to the final step in the construction of the ball and socket joint, and in this respect differs from the assembled construction illustrated in FIGURES 1 and 2.

Referring now to the drawings in detail, and particularly, to FIGURE 1, reference character 10 designates generally the ball and socket joint of the invention, which joint is used to interconnect two members, 11 and 12, which, in operation, move relatively to each other. The joint 10 includes a metallic socket 13 which has a generally cylindrical base 14 carrying an external circumferential thread 16. It will be noted that the socket 13 defines a generally hemispherical cavity 18 which extends into the socket and terminates a distance from the surface 20 of the base 14 of the socket which is approximately equivalent to the length of the threads 16. The mass of solid metal provided in the base 14 of the socket 13 facilitates the formation of the thread 16 on the socket, and enhances the mechanical strength of the socket. A suitable locknut 22 is provided for securing the socket in an aperture formed in the member 12.

By way of contrast, in previous constructions of ball and socket joints of the same general type as that constituted by the present invention, a cylindrical aperture has been provided in the base 14 which communicates with the socket 18 and permits the bearing elements to be loaded or emplaced in the socket from the base end thereof. In these joints, the base aperture is then closed by a separate plate, or by a member threaded on the thread 16 after the bearing elements have been loaded in the cavity 18 of the socket. Thus, a greater number of moving parts have been required in previous types of ball and socket joint construction. Moreover, in some instances, the removal of the nut 22 from engagement with the threads of the socket 13 for the purpose of disconnecting the socket from the number 12 has resulted in exposure of the bearing elements carried in the cavity 18 of the socket so that contamination or infiltration of grease, dust or other deleterious foreign materials into the moving parts of the socket has been possible. It will be noted that in the present construction, however, the manner in which the socket 13 is formed from a single forging with the base portion 14 thereof completely closed avoids any such exposure of the bearing elements in the cavity 18 of the socket at such times as it may be desirable to disconnect the socket 13 from the member 12.

Intermediate its ends, the socket 13 carries a circumferential flange 24 which cooperates with the locknut 22 to retain the member 12 in the relative position to the socket 13 illustrated in FIGURES 1 and 2 when the ball and socket joint is in use. At its end opposite the base portion 14, the socket 13 includes a socket closure portion 26 which, in the early stages of fabrication of the joint, assumes the cylindrical form illustrated in FIGURE 3 and, upon completion of the joint fabrication, assumes the frusto-spherical form illustrated in FIGURE 2. The method of fabrication of the joint will be subsequently discussed in greater detail.

On the internal periphery of the socket closure portion 26, a plurality of annular, axially spaced grooves 28 are formed for a purpose hereinafter described. The number, dimension and location of the grooves 28 are not particularly critical, but it is important that a plurality of such annular grooves be formed in the socket closure portion 26 between the circumferential flange 24 and the end face 30 of the socket.

The cavity 18 in the socket 13 is, as has been indicated, generally hemispherical in configuration and is dimensioned to register with a ball member designated generally by reference character 32. The ball member 32 comprises a generally spherical steel ball 34 having a steel stud or spindle 36 projecting radially from one side thereof and threaded at its end opposite the steel ball 34 as indicated by reference character 38. Preferably, the portion of the spindle 36 which extends between the ball 34 and threads 38 is tapered to a reduced diameter adjacent the threads as is most clearly illustrated in FIGURE 2. Surrounding the steel ball 34 is a sheath of high density synthetic resin 40 which is preferably provided with a generally cylindrical shank portion 42 which occupies a complementary annular groove formed in the steel spindle 36.

In order to provide contacting bearing surfaces which are each constructed of a high density, synthetic resin, a hemispherical, high density, synthetic resin bearing element 44 which is complementary in configuration to the hemispherical cavity 18 is positioned in the cavity 18 and receives the ball member 32. A second high density, synthetic resin bearing element 46 which is positioned around the ball member 32 in the final assembly of the joint is best illustrated in FIGURES 2 and 3. The bearing element 46 is shown in its relaxed or unstressed condition in the exploded view of FIGURE 3, and in its loaded or distorted configuration in FIGURE 2. In referring to FIGURE 3, it will be perceived that the resin bearing element 46 is provided with a circumferential flange 48 at its enlarged end, and that it is generally, though not precisely, frusto-spherical in configuration. In actuality, the resin bearing element 46 is distorted to a precise frusto-spherical configuration as shown in FIGURE 2 of the drawings during the process of fabricating the joint as will be hereinafter described in greater detail. The flange 48 abuts a radially inwardly extending shoulder 50 which is formed circumferentially around the interior of the socket 13 in a position in alignment with the external circumferential flange 24. The radial thickness of the resin bearing element 46 and its associated flange 48 is such that when the bearing element is positioned in the socket 13 in the general position illustrated in FIGURE 2, its internal peripheral surface is aligned with the internal peripheral surface of the hemispherical resin bearing element 44. In this manner, a smooth, continuous bearing surface is formed for bearing contact with the high density synthetic resin sheath 40 formed around the steel ball 34 of the ball member 32.

In order to seal the interior of the joint against the infiltration of foreign materials, and also to provide a bearing to facilitate oscillation of the member 11 relative to the member 12 in a plane containing the axis of the spindle 36, a dust cap 50 which is preferably constructed of a high density synthetic resin is provided, and is configured to conform to the frusto-spherical outer surface of the socket closure portion 26 of the socket 13 as illustrated in FIGURE 2. Stated differently, the dust cap 50 is provided with a generally frusto-spherical internal peripheral surface 52 which engages and mates with the external surface of the closure portion 26 of the socket 13 after the same has been swaged by a die to the final configuration illustrated in FIGURE 2. The dust cap 50 is provided with a central aperture 54 which is of substantially the same or very slightly larger diameter than the portion of the spindle 36 which the dust cap surrounds when the joint is assembled. The dust cap 50 is further provided with an axially extending annular flange 56 which functions to retain the upper end of a helical spring designated by reference character 58. The helical spring 58 is positioned between the dust cap 50 and the member 11 and functions to maintain the joint in tension during its use. Finally, the joint is connected to the second relatively moving member 11 by the use of a nut 60 which is threaded upon the threads 38 of the spindle 36 and retained in position by a cotter key or other suitable locking instrumentality.

In the construction of the ball and socket joint of the invention, the socket member 13 is formed from a single, generally cylindrical forging which is initially machined to provide the cavity 18, the external threads 16, the internal grooves 28, the radially inwardly projecting shoulder 50 and the external circumferential flange 24. The nut 22 is internally threaded for engagement with the threads 16 on the socket 13, and is preferably a locking nut which cannot be released from engagement by continued vibration or shock.

In loading the joint, the hemispherical, bearing element 44 is first inserted in the socket 13 in a position to line the hemispherical cavity 18. The ball element 32 is then placed in abutting contact with the hemispherical bearing element 44 so that the spindle 36 protrudes outwardly from the socket 13. The resin bearing element 46 is then passed over the spindle 36 and moved into the socket 13 so that the annular flange 48 thereof abuts the shoulder 50 of the socket 13. The socket 13 is then subjected to the action of a generally frusto-spherically shaped die to crimp the socket closure portion 26 inwardly around the resin bearing element 46. Compression and inward collapse of the closure portion 26 of the socket 13 by the action of the die is facilitated by the presence of the internal circumferential grooves 28 which provide a space into which the compressed metal can flow. The grooves 28 also provide a positive interlock with the resin bearing element 46 by biting into the external peripheral surface of the bearing element so that the final relationship between the metallic socket closure portion 26 and the bearing element 46 is that illustrated in FIGURE 2. In referring to FIGURE 2, it will be perceived that relative movement between the socket 13, the bearing element 46 and the bearing element 44 is prevented by the interlocking engagement of the grooves 28 with the resin bearing element 46.

After the ball and socket joint has been fabricated in the manner described, it can be used to interconnect the two relatively moving members 11 and 12 by passing the base portion 14 of the socket 13 upwardly through an aperture formed in the member 12 and then firmly interlocking the member 12 to the joint by the use of the locknut 22. The dust cap 50 and spring 58 are then positioned around the spindle 36 as shown in FIGURE 2, and the spindle passed through a mating aperture in the member 11. Finally, the locknut 60 is engaged with the threads 38 on the spindle 36 to move the member 11 upwardly on the spindle and place the spring 58 in compression.

To briefly review the advantages and improvements which characterize the present invention, as compared to ball and socket joints of this general type which have previously been constructed, the invention is characterized in having fewer parts which must be assembled during fabrication of the joint, and in having a more efficient sealing characteristic for the purpose of preventing infiltration of foreign materials to the interior of the joint than ball and socket joints of this type as previously constructed. Moreover, at such time as it may be desired to renew or repair the joint, it may be easily removed from the two members which it interconnects by merely removing the locknut 22 from the base portion 14 of the socket 13. Such disconnection of the joint does not result in exposure of the ball member 32, or the interior of the joint to contact with dust, water or other deleterious materials. The provision of contacting bearing surfaces which are constructed of high density synthetic resins, such as high molecular weight polyamides or high density polyethylene, provides efficient and long-lasting bearing action without the necessity for lubrication during the life of the joint. Moreover, the contacting bearing elements within the socket of the joint are maintained in fixed spatial relationship to each other throughout the life of the joint by the positive interlock which is provided between the bearing elements and the metallic socket.

Although a typical and exemplary embodiment of the invention has been disclosed in the foregoing description and in the accompanying drawings, it will be readily perceived that certain modifications and changes may be made in the specific structure described without a significant departure from the basic principles which underlie the invention. Insofar, therefore, as such changes and innovations do continue to rely upon these basic principles, all modified versions of the specific structure herein described by way of example are deemed to be circumscribed by, and to fall within, the spirit and scope of the present invention except as the same may be necessarily limited by the appended claims or reasonable equivalents thereof.

We claim:

1. A ball and socket joint comprising:
   a unitary, one-piece metallic socket member having
      a solid, cylindrical externally threaded end portion;
      an external, circumferential flange around said socket and spaced axially from the threads on said end portion; and
      a frusto-spherical, closure portion positioned on the opposite side of said circumferential flange from said end portion, said closure portion having a concave, frusto-spherical internal surface having a plurality of annular grooves therein, said grooves extending around the longitudinal axis of the socket member;
   a ball member positioned in said metallic socket member and including an elongated spindle extending out of said socket member through said frusto-spherical closure portion;
   high density, synthetic resin bearing means surrounding said ball member in said metallic socket member; and
   an internally threaded nut engageable with the external thread on said metallic socket member for connecting said joint to an external member surrounding said socket member between said circumferential flange and said externally threaded end portion.

2. A ball and socket joint as claimed in claim 1 wherein said ball member includes
   a metallic ball; and
   a sheath of high density, synthetic resin surrounding said metallic ball and positioned within, and in bearing contact with, said synthetic resin bearing means.

3. A ball and socket joint as claimed in claim 1 wherein said bearing means comprises:
   a hemispherical first bearing element; and
   a complementary second bearing element forming a generally spherical enclosure with said hemispherical first bearing element and being interlocked with the grooves in the frusto-conical internal surface of said closure portion to prevent relative movement between said second bearing element and said metallic socket member.

4. A ball and socket joint as claimed in claim 2 wherein said bearing means comprises:
   a hemispherical first bearing element engaging a portion of said sheath of high density, synthetic resin; and
   a complementary second bearing element forming a generally spherical enclosure with said hemispherical first bearing element and being interlocked with the grooves in the frusto-conical internal surface of said closure portion to prevent relative movement between said second bearing element and said metallic socket member.

5. A ball and socket joint comprising:
   a unitary, one-piece metallic socket member having
      a solid, cylindrical externally threaded end portion;
      an external, circumferential flange around said socket member and spaced axially from the threads on said end portion; and
      a frusto-spherical closure portion positioned on the opposite side of said circumferential flange from said end portion, said closure portion having a concave frusto-spherical internal surface having a plurality of annular grooves therein, said grooves extending around the longitudinal axis of the socket member;
   a ball member positioned in said metallic socket member and including an elongated spindle extending out of said socket member through said frusto-spherical closure portion;
   high density synthetic resin bearing means surrounding said ball member and said metallic socket member; and
   threaded stop means engageable with the external thread on said metallic socket member for connecting said joint to an external member surrounding said socket member between said circumferential flange and said externally threaded end portion.

(References on following page)

References Cited

UNITED STATES PATENTS

| | | | |
|---|---|---|---|
| 1,123,796 | 1/1915 | Porter et al. | 287—90 |
| 2,124,034 | 7/1938 | Hufferd | 287—90 |
| 3,079,184 | 2/1963 | Melton et al. | 287—90 |
| 3,103,370 | 9/1963 | Krizman | 287—90 |
| 3,149,855 | 9/1964 | Adloff et al. | 287—87 X |
| 3,197,245 | 7/1965 | Beer | 287—87 |
| 3,223,433 | 12/1965 | Parks | 287—90 X |

FOREIGN PATENTS

| | | |
|---|---|---|
| 737,811 | 10/1955 | Great Britain. |
| 929,873 | 6/1963 | Great Britain. |

CARL W. TOMLIN, *Primary Examiner.*

A. V. KUNDRAT, *Assistant Examiner.*